United States Patent
Amit et al.

(10) Patent No.: US 9,239,842 B2
(45) Date of Patent: *Jan. 19, 2016

(54) REAL-TIME IDENTIFICATION OF DATA CANDIDATES FOR CLASSIFICATION BASED COMPRESSION

(71) Applicant: INTERNATIONAL BUSINESS MACHINES CORPORATION, Armonk, NY (US)

(72) Inventors: Jonathan Amit, Omer (IL); Lilia Demidov, Ness-Tziona (IL); George Goldberg, Bat Yam (IL); Nir Halowani, Holon (IL); Ronen I. Kat, Kraf-Saba (IL); Chaim Koifman, Rishon Lezion (IL); Sergey Marenkov, Yehud (IL); Dmitry Sotnikov, Givataim (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/704,700

(22) Filed: May 5, 2015

(65) Prior Publication Data
US 2015/0234852 A1 Aug. 20, 2015

Related U.S. Application Data

(63) Continuation of application No. 14/074,053, filed on Nov. 7, 2013, now Pat. No. 9,053,122, which is a continuation of application No. 13/738,262, filed on Jan. 10, 2013, now Pat. No. 9,053,121.

(51) Int. Cl.
G06F 7/00 (2006.01)
G06F 17/30 (2006.01)

(52) U.S. Cl.
CPC .... *G06F 17/30153* (2013.01); *G06F 17/30598* (2013.01)

(58) Field of Classification Search
CPC ..................................................... G06F 17/30
See application file for complete search history.

(56) References Cited

U.S. PATENT DOCUMENTS 5,532,692 A 7/1996 Tatsuya
5,546,477 A 8/1996 Knowles et al.
(Continued)

FOREIGN PATENT DOCUMENTS

WO 2014108818 A1 7/2014

OTHER PUBLICATIONS

Papaefstathiou, Ioannis, "Accelerating ATM: On-line Compression of ATM Streams", Feb. 2, 1999, pp. 233-239, PCCC 1999, Scottsdale, AZ.

(Continued)

*Primary Examiner* — Etienne Leroux
*Assistant Examiner* — Farhad Agharahimi
(74) *Attorney, Agent, or Firm* — Griffiths & Seaton PLLC

(57) ABSTRACT

Identification of data candidates for data processing is performed in real time by a processor device in a computing environment. Data candidates are sampled for performing a classification-based compression upon the data candidates. A heuristic is computed on a randomly selected data sample from the data candidate for determining if the data candidate may benefit from the classification-based compression, wherein a ratio is summed between the actual number of the characters and the expected number of the characters, and then dividing the ratio by a number of the data classes that are not empty, wherein the non-classifiable data are included in the number of the data classes during the dividing, and the number of the data classes, that are not empty, have characters that belong to the class that were observed in the input; and the classification-based compression is performed on the data candidates if the ratio exceeds a threshold.

6 Claims, 4 Drawing Sheets

(56) References Cited

U.S. PATENT DOCUMENTS

| | | | |
|---|---|---|---|
| 5,768,445 A | | 6/1998 | Troeller et al. |
| 6,049,797 A | * | 4/2000 | Guha et al. ............................ 1/1 |
| 6,055,339 A | | 4/2000 | Wilkinson |
| 6,253,264 B1 | | 6/2001 | Sebastian |
| 6,731,814 B2 | | 5/2004 | Zeck et al. |
| 7,774,456 B1 | | 8/2010 | Lownsbrough et al. |
| 7,930,436 B1 | | 4/2011 | Znosko |
| 8,306,956 B2 | | 11/2012 | Livshits |
| 8,676,725 B1 | | 3/2014 | Lin et al. |
| 8,712,978 B1 | | 4/2014 | Shilane et al. |
| 8,738,838 B2 | | 5/2014 | Cho et al. |
| 2001/0038347 A1 | | 11/2001 | Avery et al. |
| 2001/0054131 A1 | | 12/2001 | Alvarez, II et al. |
| 2002/0028021 A1 | | 3/2002 | Foote et al. |
| 2002/0198863 A1 | * | 12/2002 | Anjur et al. ........................ 707/1 |
| 2003/0030575 A1 | * | 2/2003 | Frachtenberg et al. ......... 341/51 |
| 2004/0001160 A1 | | 1/2004 | Herley |
| 2004/0228533 A1 | | 11/2004 | Adelmann |
| 2005/0135690 A1 | | 6/2005 | Golla et al. |
| 2006/0106867 A1 | | 5/2006 | Burges et al. |
| 2006/0232593 A1 | | 10/2006 | Lai et al. |
| 2009/0052784 A1 | | 2/2009 | Covell et al. |
| 2010/0030797 A1 | | 2/2010 | Johnson et al. |
| 2010/0070543 A1 | | 3/2010 | Backa |
| 2010/0161650 A1 | | 6/2010 | Chaitanya et al. |
| 2010/0325094 A1 | | 12/2010 | Yang et al. |
| 2011/0252183 A1 | | 10/2011 | Cho et al. |
| 2011/0285559 A1 | * | 11/2011 | Fallon ............................ 341/87 |
| 2012/0001777 A1 | | 1/2012 | Litvak |
| 2012/0207216 A1 | | 8/2012 | Yu et al. |
| 2012/0278884 A1 | * | 11/2012 | Menoher ........................ 726/22 |
| 2013/0179659 A1 | | 7/2013 | Seo et al. |
| 2013/0254441 A1 | | 9/2013 | Kipnis et al. |
| 2013/0275396 A1 | | 10/2013 | Condict et al. |
| 2014/0195497 A1 | | 7/2014 | Amit et al. |
| 2014/0195498 A1 | | 7/2014 | Asher et al. |
| 2014/0195499 A1 | | 7/2014 | Amit et al. |
| 2014/0195500 A1 | | 7/2014 | Amit et al. |

OTHER PUBLICATIONS

Moerti et al., "Direct Access Storage Device Compression and Decompression Data Flow", Mar. 31, 2005, 7 pages, IPCOM000116855D, http:www.ip.com/pubview/IPCOM000116855D.

IBM, "Efficient Monitoring of Plan Execution CPU Costs in a Database Server", Sep. 25, 2009, 10 pages, IPCOM000188191D, IP.com.

Coyne et al., "IBM System Storage N series Data Compression and De-duplication Data ONTAP 8.1 Operating in 7-Mode" 110 pages, Jul. 2012, www.ibm.com/redbooks/sg248033.

IBM, "Methods for Measuring the CPU overhead of a transaction oriented monitoring tool", Jan. 19, 2006, IPCOM000133268D, IP.com.

"Object Specific Image Reconstruction using a Compressive Sensing Architecture for Application in Surveillance Systems"pp. 1167-1180, IEEE Transactions on Aerospace and Electronic Systems, vol. 45, No. 3, Jul. 2009.

Gasparello et al., "Real-Time Network Streaming of Dynamic 3D Content with In-frame and Inter-frame Compression"1 page., AN-12316686; 2011.

Mahalanobis, Abhijit, "Transform Domain Adaptive Compressive Sensing of Specific Objects", Apr. 25, 2011, 9 pagesVisual Information Processing XX, Orlando, FL.

Coyne et al., "IBM System Storage N Series Data Compression and Deduplication Data ONTAP 8.1 Operating in 7-Mode"Jul. 2012, http://www.ibm.com/redbooks/sg24-8033-00.

Ruei-Sung Lin et al., SPEC Hashing: Similarity Preserving Algorithm for Entropy-based Coding, Jun. 13, 2010, pp. 848-8542010 IEEE Conference.

Nobuyoshi Sato et al., Target Selection by Similarity Preserve Hash in Distributed System for Geographical Origin Identification of Vegetables, Apr. 18, 2006, 6 pagesIEEE.

* cited by examiner

REAL-TIME IDENTIFICATION OF DATA CANDIDATES FOR CLASSIFICATION BASED COMPRESSION

CROSS REFERENCE TO RELATED APPLICATIONS

This application is a Continuation of U.S. patent application Ser. No. 14/074,053, filed on Nov. 7, 2013, which is a Continuation of U.S. patent application Ser. No. 13/738,262, filed on Jan. 10, 2013, both of which are hereby incorporated by reference in their entirety.

FIELD OF THE INVENTION

The present invention relates in general to computers, and more particularly to real-time identification of data candidates for classification-based compression in a computing environment.

DESCRIPTION OF THE RELATED ART

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems include virtual storage components.

Column based compression, classification compression, and data compression is widely used to reduce the amount of data required to process, transmit, or store a given quantity of information. Data compression is the coding of data to minimize its representation. Compression can be used, for example, to reduce the storage requirements for files, to increase the communication rate over a channel, or to reduce redundancy prior to encryption for greater security.

SUMMARY OF THE DESCRIBED EMBODIMENTS

Various embodiments are provided for identification of data candidates for data processing performed in real time by a processor device in a computing environment. In one embodiment, the method comprises sampling data candidates for performing a classification-based compression upon the data candidates. A heuristic is computed on a randomly selected data sample from the data candidate for determining if the data candidate may benefit from the classification-based compression, wherein a ratio is summed between the actual number of the characters and the expected number of the characters, and then dividing the ratio by a number of the data classes that are not empty, wherein the non-classifiable data are included in the number of the data classes during the dividing, and the number of the data classes, that are not empty, have characters that belong to the class that were observed in the input; and the classification-based compression is performed on the data candidates if the ratio exceeds a threshold.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
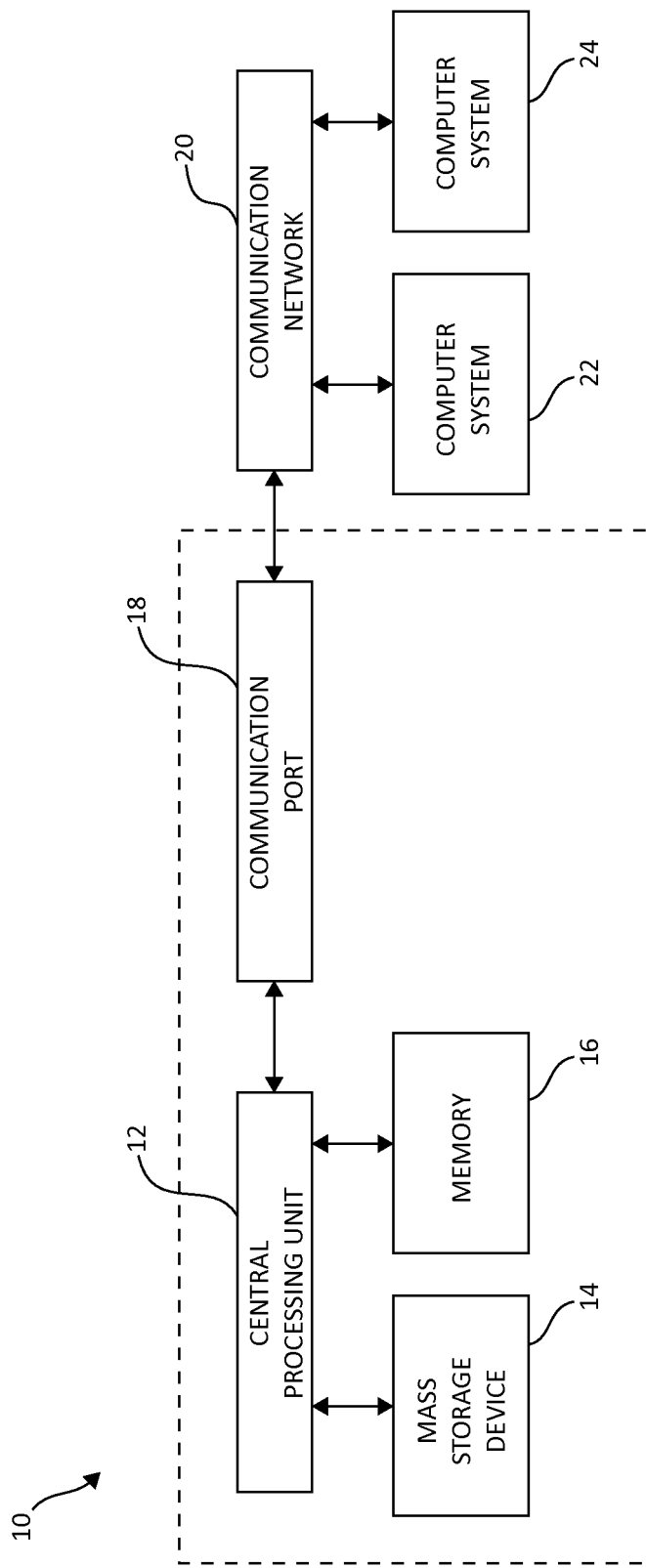
FIG. 1 is a block diagram illustrating a computer storage environment having an exemplary storage device in which aspects of the present invention may be realized.

As previously mentioned, computing systems are used to store and manage a variety of types of data. Compressing similar data using the same compression stream improves the compression ratio and reduces the required storage. For data that have an internal structure, e.g., tabular data or semi-structured data, separating sequences of data that belong to a class of data into separate compression streams improves the compression ratio. For example, when data is composed of interleaving sequences of text and numbers, compressing the text and numbers separately will provide a better compression ratio. A well-known technology for databases is column compression, where data stored in database tables is compressed column-wise (not row-wise), hence the notation of column compression, proving a better compression ratio, as data in a column is typically more similar than data between columns allowing the compression module to better exploit similarities and provide a better data reduction. The concept may be adapted to semi-structured data such as Hypertext Markup Language (HTML), Extensible Markup Language (XML), JavaScript Objected Notation (JSON), etc. By understanding the underlying structure of the data, each class of data may be identified and compressed—that is by using classification-based compression. Classification-based compression is a generalization of column compression, where the structure of the data is not strictly well-defined columns. In classification-based compression, the data of similar type is grouped together in the same compression stream. Classification-based compression allows for a smaller alphabet footprint, and assists in identifying repetitions that are further apart. These groups (e.g., the data of similar type that is grouped together in the same compression stream) can be called "virtual columns" in an analogy for column compression. However, not all data is structured or semi-structured, therefore, performing classification-based compression should be done on data which have a clear tabular or semi-tabular structure. For example, images, videos and encrypted or compressed data have no such tabular like structure.

In a block storage system, data blocks are written to the storage without any indication what type of data is written, and no indication of relation between writes is given. Thus, it is impossible to use column compression, as the columns need to be given in advances, but the more general method of classification-based compression can be used. Classification-based compression is best employed on data which is structured or semi-structured. Therefore, it is necessary to identify which writes include data with a tabular-like structure, and which writes do not.

Thus, in one embodiment, the present invention provides a solution for real-time identification as to whether a write buffer is potentially composed of data sequences (e.g., candidates) that can be separated into different compression streams. Since the "type" of data written is not provided (to the storage system), and present invention allows for the storage system to decide in an autonomic manner how to compress the data. A detection operation reads small fragments (e.g., random samples from a data stream and/or data block) of the input data that are randomly selected, and estimates if classes of data are present in the input, and then provide a decision whether to use classification-based compression on this analyzed data. When the data classes are defined in advance, the presence of the class is determined by analyzing how many characters (bytes) from the input "falls" into the predefined data classes. When the data classes are not defined in advance, the classes are determined automatically by looking at pairs of characters and determining character clusters. Thus, embodiments are provided for when the classes of data are defined in advance and when the data classes should be determined in real-time. The identification of classes in the data may be performed in a single pass, is not limited to a rigid format, and supports both fixed and variable data lengths.

As will be described below, in one embodiment, data candidates (e.g., a write operation in the block storage system) are identified in real time for performing a classification-based compression, performed by a processor device, in a computing environment. Data candidates are sampled for performing a classification-based compression upon the data candidates. A heuristic is computed on a randomly selected data sample from the data candidate for determining if the data candidate may benefit from the classification-based compression. A decision is provided for approving the classification-based compression on the data candidates according to the heuristic.

Turning now to FIG. 1, exemplary architecture 10 of data storage systems in a computing environment is depicted. The computer system 10 includes central processing unit (CPU) 12, which is connected to mass storage device(s) 14 and memory device 16. Mass storage devices can include hard disk drive (HDD) devices, solid-state devices (SSD) etc., which can be configured in a redundant array of independent disks (RAID). The backup operations further described can be executed on device(s) 14, located in system 10 or elsewhere. Memory device 16 can include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2:
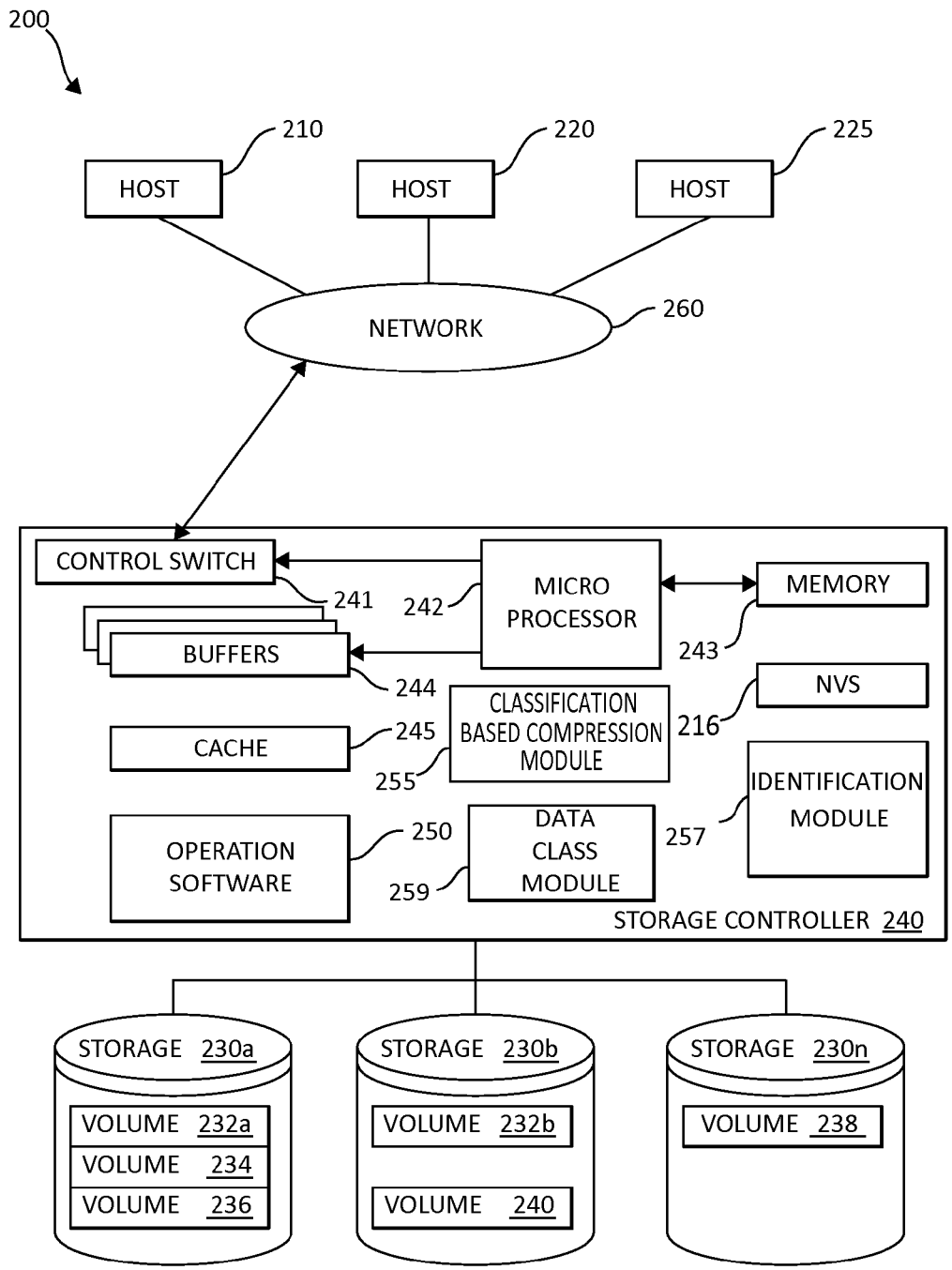
FIG. 2 is a block diagram illustrating a hardware structure of an exemplary data storage system in a computer system in which aspects of the present invention may be realized.

FIG. 2 is an exemplary block diagram 200 showing a hardware structure of a data storage system in a computer system according to the present invention. Referring to FIG. 2, there are shown host computers 210, 220, 225, each acting as a central processing unit for performing data processing a part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 1 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps associated with managing storage 230 and executing the steps and methods of the present invention in a computer storage environment. In one embodiment, system memory 243 includes, is associated, or is in communication with the operation software 250 in a computer storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the Cache 245 for any purposes suited to accomplish the objectives of the present invention. In some embodiments, a backup power source (not shown in FIG. 2), such a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a classification-based compression module 255, an identification module 257, and a data class module 259 in a computer storage environment. The classification-based compression module 255, the identification module 257, and the data class module 259 may work in conjunction with each and every component of the storage controller 240, the hosts 210, 220, 225, and storage devices 230. The classification-based compression module 255, the identification module 257, and the data class module 259 may be structurally one complete module working together and in conjunction with each other for performing such functionality as described below, or may be individual modules. The classification-based compression module 255, the identification module 257, and the data class module 259 may also be located in the cache 245 or other components of the storage controller 240 to accomplish the purposes of the present invention.

The storage controller 240 may be constructed with a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, classification-based compression module 255, the identification module 257, and the data class module 259 on which information may be set. Multiple buffers 244 may be implemented with the present invention in a computing environment, or performing other functionality in accordance with the mechanisms of the illustrated embodiments.

In one embodiment, by way of example only, the host computers or one or more physical or virtual devices, 210, 220, 225 and the storage controller 240 are connected through a network adaptor (this could be a fiber channel) 260 as an interface i.e., via a switch sometimes referred to as "fabric." In one embodiment, by way of example only, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, classification-based compression module 255, the identification module 257, and the data class module 259 are in communication with each other and may be separate or one individual component(s). Also, several, if not all of the components, such as the operation software 245 may be included with the memory 243 in a computer storage environment. Each of the components within the storage device may be linked together and may be in communication with each other for purposes suited to the present invention.

Figure 3:
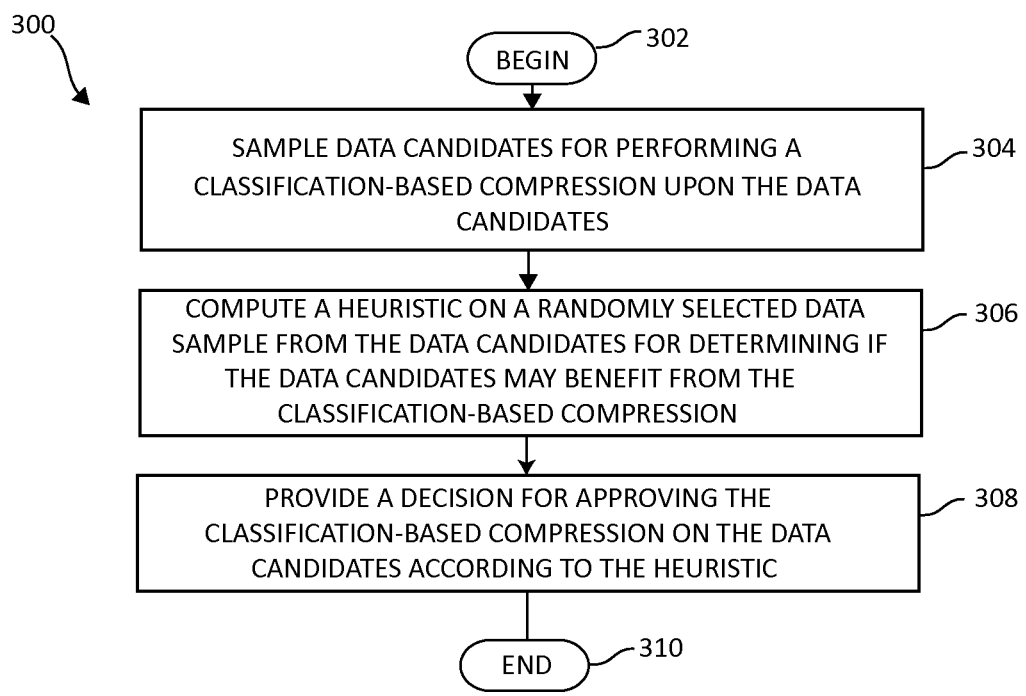
FIG. 3 is a flow chart diagram illustrating an exemplary method for real-time identification of data candidates for classification-based compression in which aspects of the present invention may be realized.

Turning now to FIG. 3, an exemplary method 300 for real-time identification of data candidates for classification-based compression is illustrated. The method 300 begins (step 302) by sampling data candidates for performing a classification-based compression upon the data candidates (step 304). A heuristic is computed on a randomly selected data sample from the data candidate for determining if the data candidate may benefit from the classification-based compression (step 306). A decision is provided for approving the classification-based compression on the data candidates according to the heuristic (step 308). The method 300 ends (step 310).

Figure 4:
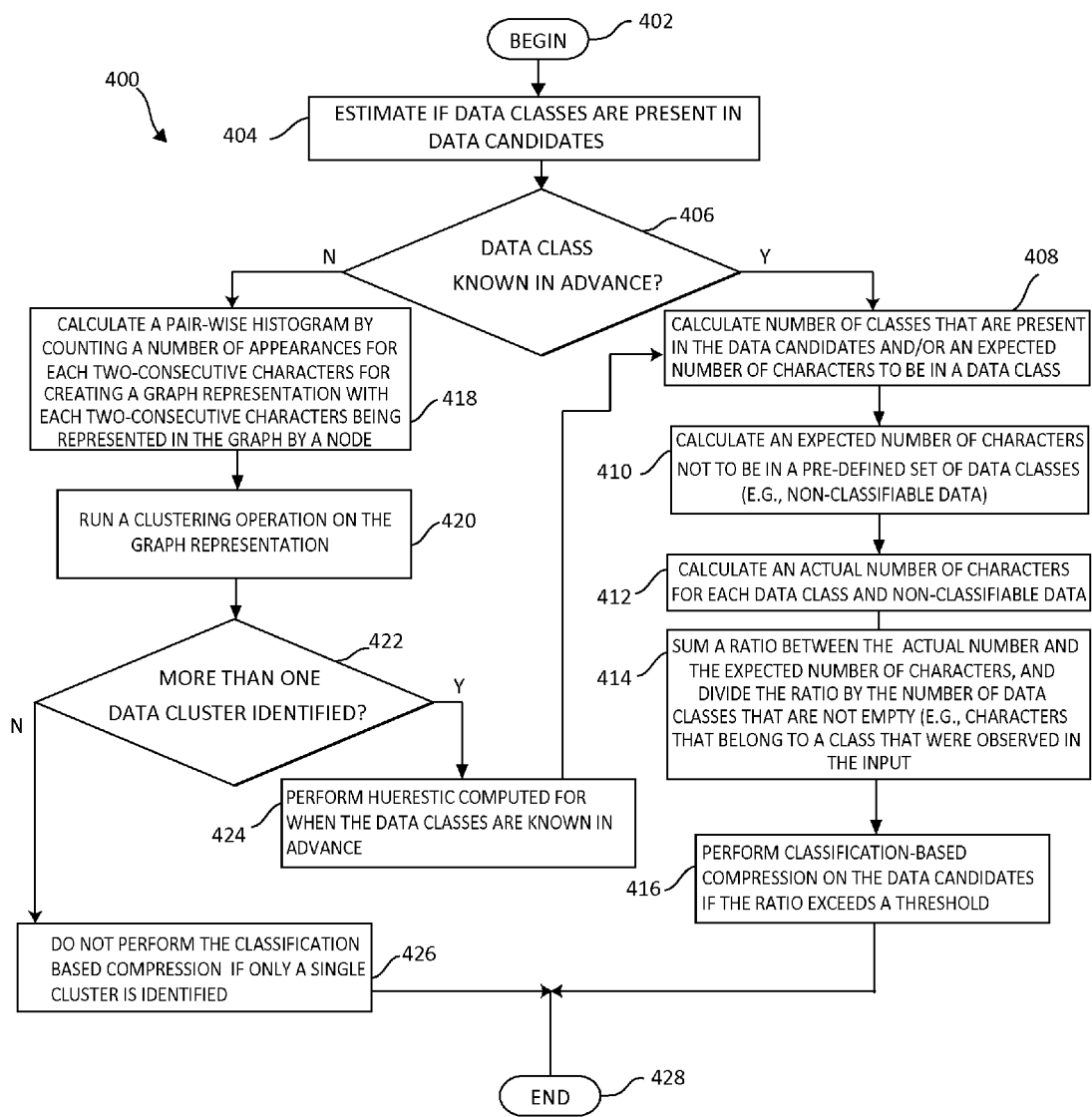
FIG. 4 is a flow chart diagram illustrating an additional exemplary method for identifying and sampling data candidates for performing a classification-based compression in in which aspects of the present invention may be realized.

Based upon the foregoing, turning now to FIG. 4, an additional exemplary method 400 for identifying and sampling data candidates for performing a classification-based compression is depicted. For sampling data candidates and calculating the heuristic on a randomly selected data sample from the data candidate for determining if the data candidate may benefit from the classification-based compression, as described in FIG. 3, the method 400 begins (step 402) by estimating if data classes are present in the data candidates from a randomly selected data sample (see FIG. 3 step 304) (step 404). The method determines if the data classes are known in advance (step 406). If yes, the method 400, for each one of the data classes, calculates a number of classes that are present in the data candidates and/or an expected number of characters to be in a data class (step 408). An expected number of characters that will not belong to a predefined set of the data classes are calculated (this is the non-classifiable data) (step 410). An actual number of the characters for each of the data classes and the non-classifiable data are also calculated (step 412). A minimum, a maximum, an average, and a distribution of a number of consecutive characters in each of the data classes are calculated. A ratio, between the actual number of the characters and the expected number of the characters, is summed, and then the ratio is divided by the number of the data classes that are not empty (e.g., characters that belong to the class that were observed in the input) (step 414). The non-classifiable data are included in the number of the data classes during the dividing. The classification-based compression is performed on the data candidates if the ratio exceeds a threshold (step 416). However, returning to step 406, if data classes are not known in advance, the method 400 calculates a pair-wise histogram by counting a number of appearances for each two-consecutive characters for creating a graph representation, with each characters being represented in the graph by a node. Each two-consecutive characters are represented by an edge between the character nodes, and the weight associated with the edge is the number of appearances of the two-consecutive characters (step 418). A clustering operation is run on the graph representation whereby the clustering operation computes sets of characters that are tightly grouped and form a group, and ignore (remove) sequences (e.g., candidates) that are not tightly connected, which is a filtering outliers operation. Each group (cluster) of nodes (characters) in the graph representation is a data class (step 420). The method 400 then checks to see if more than one cluster is identified (step 422). The heuristic computed for the data classes that are known in advance for performing the classification-based compression is then executed if more than one cluster is identified (step 424). If the clustering operation outputs a single cluster, the classification-based compression is not performed if the clustering operation outputs a single cluster (step 426). The method 400 ends (step 428).

As described in FIG. 3-4, the embodiments of the present invention, (1) select a small sample of the input data buffer, (2) compute a heuristic to determine whether the input data can benefit from classification-based compression, and (3) compresses the input using classification-based compression only if it will provide a benefit, otherwise, a default system action (standard compression or no compression) may be performed. The input data buffer can be an application file or a data block. The data sample may be the whole input buffer and/or a randomly selected (or predefined) sequences of bytes from the buffer. Moreover, when the data classes are known in advance (e.g., uppercase letters, lowercase letters, numbers), the following heuristic can be used, as illustrated in FIG. 4. 1) For each data class, based on the size of the class (distinct characters in the class), the expected number of input characters (from the data sample) to be in the data class is computed. 2) The expected number of input characters that will not belong to the pre-defined set of data classes—denoted by non-classified, is computed. 3) The observed (actual) number of bytes for each data class, including the non-classified, is computed. Moreover, the minimum, maximum, average, and distribution of the number of consecutive bytes in each class may be computed. 4) A ratio, between observed and expected number of characters, is summed, and then the ratio is divided by the number of classes (the non-classified is consider as class here) that are not empty (characters that belong to the class were observed in the input). 5) If the ratio is higher than a threshold, such as two (the value of 2 being used only as an example for illustration purposes), then the data should be compressed using classification-based compression. It should be noted that the embodiments described herein are compatible with real-time requirements of storage array and provide the decision and identification without actually performing and using any compression method, reading or parsing the data, but rather using the sampling and heuristic method for identification as described above. Moreover, the illustrated embodiments do not assume anything on the input buffer block, and provide the identification by analyzing a sample of the data content without the need for any known structural format. Also, the embodiments described herein analyze data blocks by retrieving a sample of the data and does not process all the data nor not try to determine the most appropriate compression method to be used, but rather just to determine the intra-block classification of the data.

According to the forgoing discussion of identifying table boundaries in data block compression, compressing each column independently will provide a higher compression ratio rather than compressing the entire table with one stream. It should be noted that a variety of compression techniques may be used to accomplish the mechanisms of the present invention (e.g., column compression). The reason for the increased compression ratio is that the data in each column is relatively homogeneous. As a result, efficiency and productivity is increased based upon the mechanisms of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for real-time identification of data candidates for data processing by a processor device in a computing environment, the method comprising:
   sampling data candidates for performing a classification-based compression upon the data candidates; and
   computing a heuristic on a randomly selected data sample from the data candidate thereby determining if the data candidates may benefit from the classification-based compression, wherein a decision is provided for approving the classification-based compression on the data candidates according to the heuristic;
   wherein if data classes are estimated by the processor to be present in the data candidates;
      summing a ratio between the actual number of the characters and the expected number of the characters, and then dividing the ratio by a number of the data classes that are not empty, wherein the non-classifiable data are included in the number of the data classes during the dividing, and the number of the data classes, that are not empty, have characters that belong to the class that were observed in the input; and
      performing the classification-based compression on the data candidates if the ratio exceeds a threshold.

2. The method of claim 1, further including, if data classes are known in advance, computing the heuristic by:
   for each one of the data classes, calculating an expected number of characters to be in a data class,
   calculating an expected number of characters that will not belong to a predefined set of the data classes, wherein the characters that do not belong to the predefined set of the data classes are non-classifiable data, and
   calculating an actual number of the characters for each of the data classes and the non-classifiable data, wherein a minimum, a maximum, an average, and a distribution of a number of consecutive characters in each of the data classes are calculated.

3. The method of claim 1, further including, if data classes are not known in advance:
   calculating a pair-wise histogram by counting a number of appearances for each two-consecutive characters for creating a graph representation having weighted edges, wherein a weight is the number of appearances of the two-consecutive characters,
   running a clustering operation on the graph representation whereby the clustering operation filters outliers, and each cluster in the graph representation is a data class, and executing the heuristic computed for data classes that are known in advance for performing the classification-based compression if more than one cluster is identified, wherein the classification-based compression is not performed if the clustering operation outputs a single cluster.

4. The method of claim 1, wherein the identifying further includes:
analyzing data in a write buffer independently for specific character types, and
performing the classification-based compression if a ratio of the specific character types exceeds non-specific character types by a threshold amount.

5. The method of claim 1, further including performing a classification identification on the data candidates during at least one single pass for both fixed data lengths and variable data lengths.

6. The method of claim 1, wherein the data candidates are data blocks for determining intra-block classification of the data for performing the classification-based compression on the data candidates.

* * * * *